No. 863,380. PATENTED AUG. 13, 1907.
E. GIER.
FRUIT PICKER.
APPLICATION FILED JAN. 3, 1907.
3 SHEETS—SHEET 1.
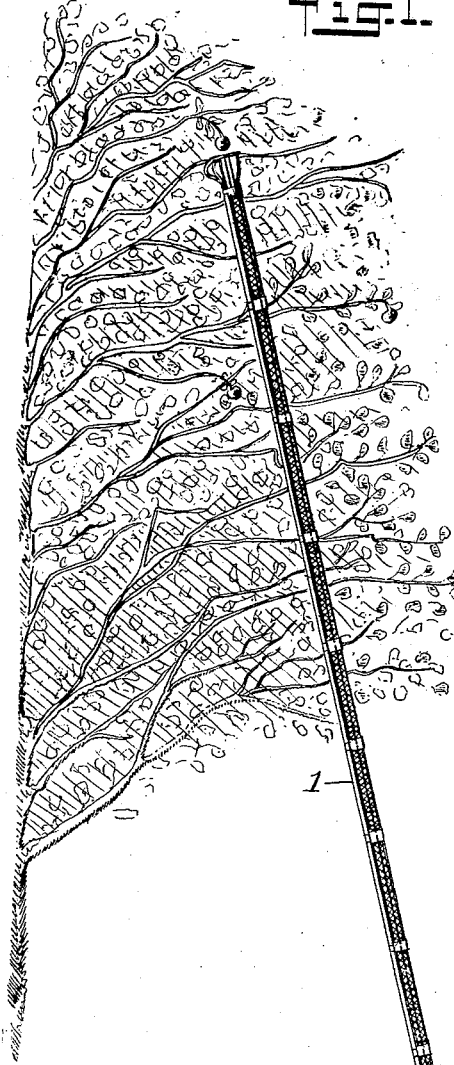
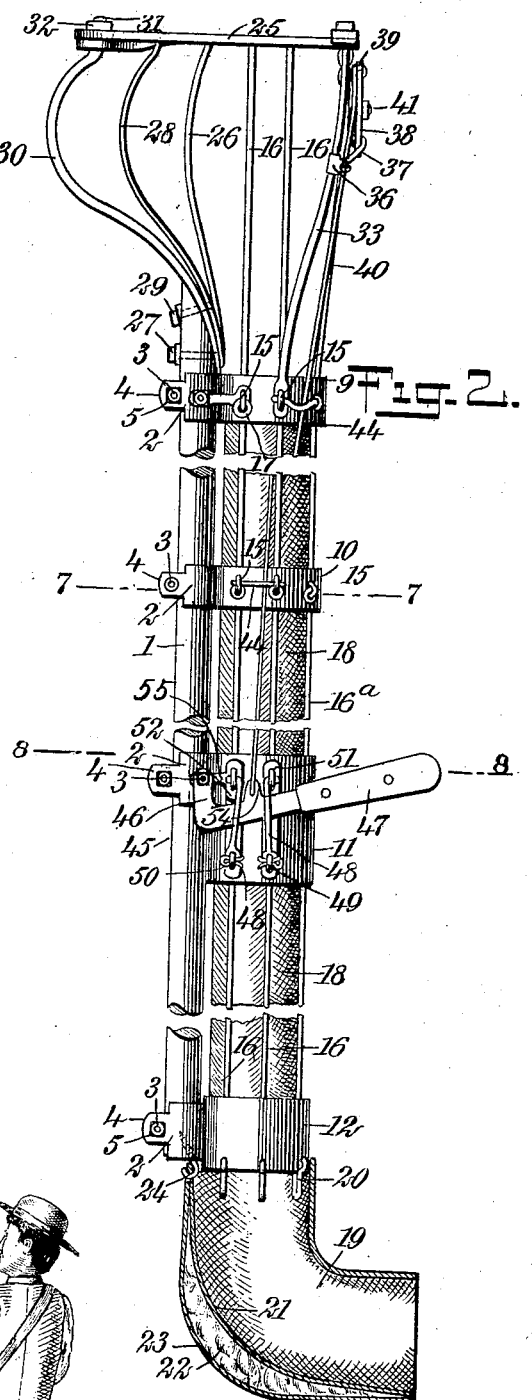
Fig. 1.
Fig. 2.
WITNESSES
Geo. W. Naylor
P. W. Hardie
INVENTOR
Emil Gier
BY Munn & Co
ATTORNEYS

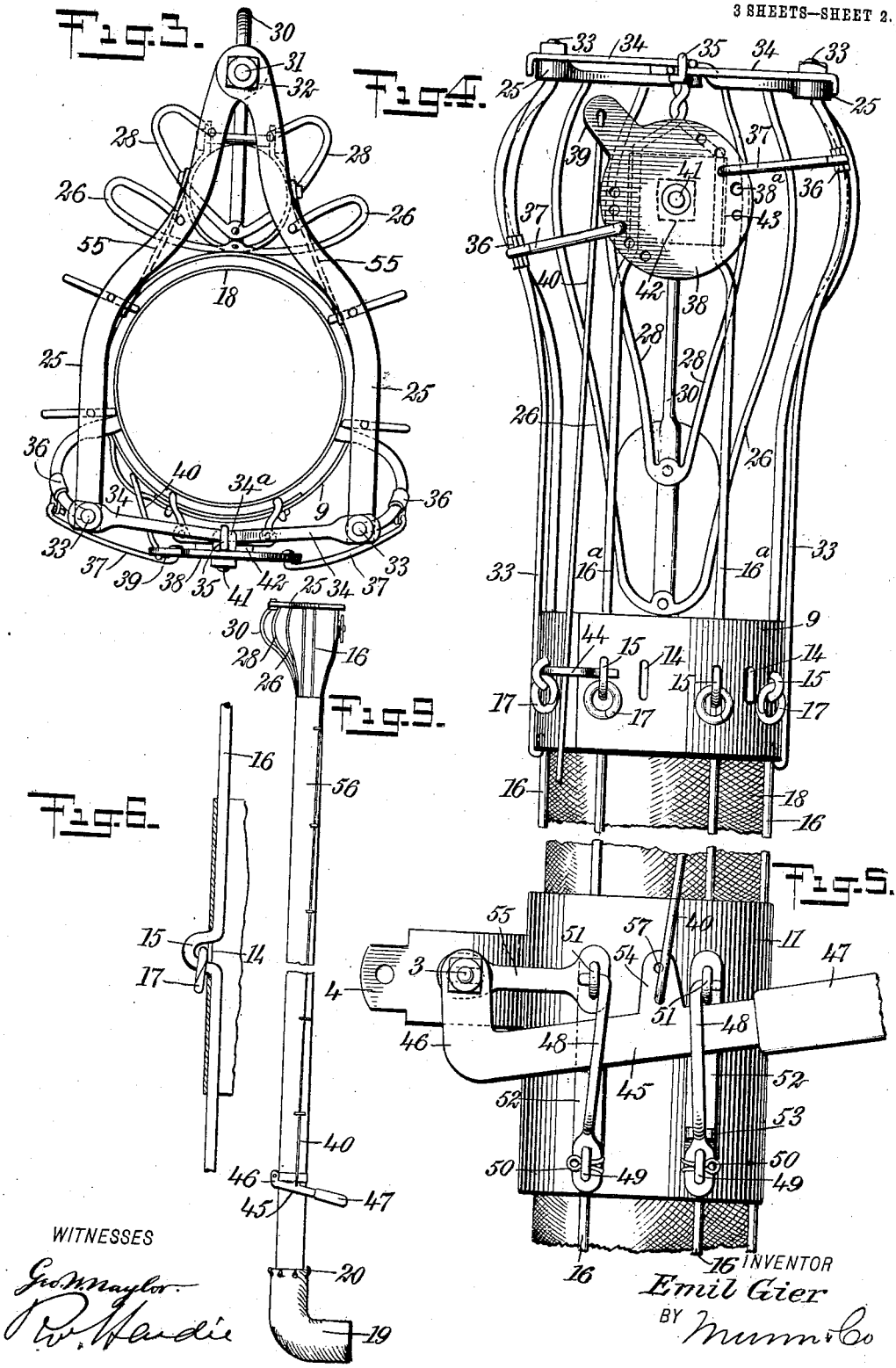

No. 863,380. PATENTED AUG. 13, 1907.
E. GIER.
FRUIT PICKER.
APPLICATION FILED JAN. 3, 1907.
3 SHEETS—SHEET 3.
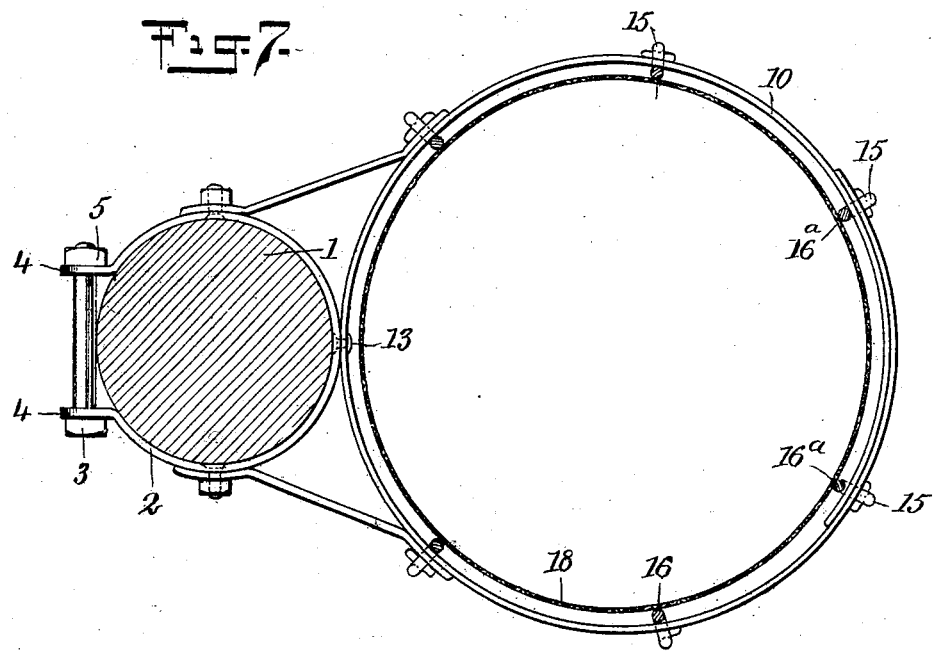
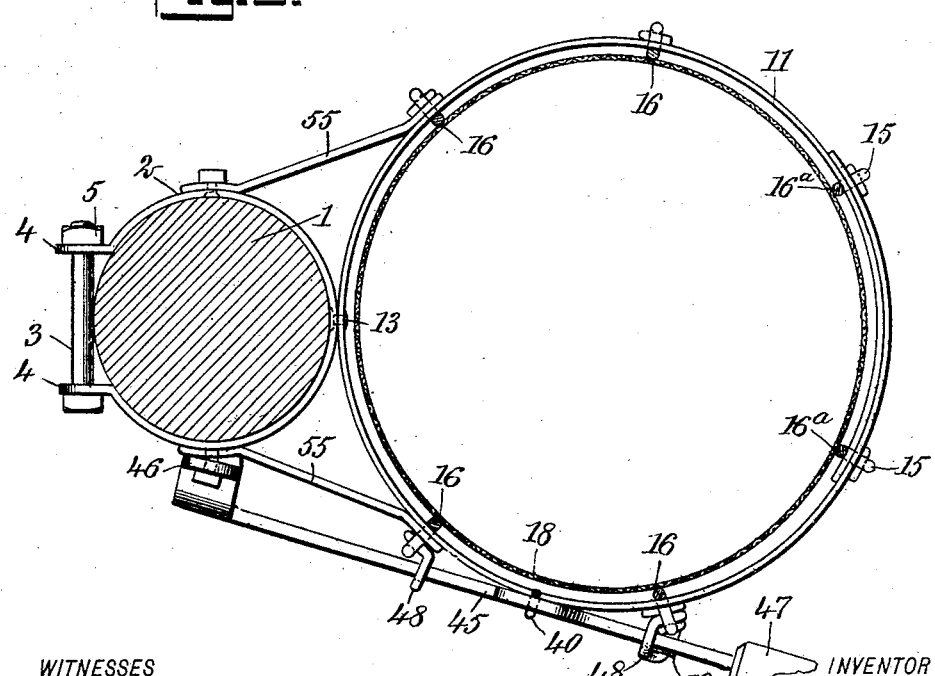
WITNESSES
Geo. W. Naylor
R. W. Hardie
INVENTOR
Emil Gier
BY Munn & Co.
ATTORNEYS

UNITED STATES PATENT OFFICE.

EMIL GIER, OF RHINELAND, TEXAS.

FRUIT-PICKER.

No. 863,380.　　　　　Specification of Letters Patent.　　　　Patented Aug. 13, 1907.

Application filed January 3, 1907. Serial No. 350,698.

*To all whom it may concern:*

Be it known that I, EMIL GIER, a citizen of the United States, and a resident of Rhineland, in the county of Knox and State of Texas, have invented a new and Improved Fruit-Picker, of which the following is a full, clear, and exact description.

This invention relates to means for detaching fruit from a tree, and has for its object to provide means adapted to conveniently detach the fruit without injury thereto, and also to enable the picker to be used with fruit of various sizes.

Other objects relating to the specific construction and special arrangement of the several parts of my invention will be understood by the following description and accompanying drawings, in which drawings like characters of reference indicate like parts throughout the views, and in which Figure 1 is a side elevation of a device embodying my invention, as constructed and used by the operator in removing fruit from a tree; Fig. 2 is a side elevation partly in section and partly broken away, of a device embodying my invention; Fig. 3 is a plan of the device shown in Fig. 2; Fig. 4 is a front elevation of the upper end of the device shown in Fig. 2; Fig. 5 is a side elevation of the central portion of the device shown in Fig. 2; Fig. 6 is a fragmentary view showing a clamping collar in vertical section, and tube wires connected therewith and secured thereto by means of a locking ring; Fig. 7 is a horizontal section taken on the line 7—7 of Fig. 2; Fig. 8 is a horizontal section taken on the line 8—8 of Fig. 2, and Fig. 9 is a side elevation of a modified construction.

As illustrated in the drawings, the receiving and conductor members of my invention are mounted upon a staff 1 which may be of any construction, and made of bamboo, wood, strong cane or other suitable material adapted to make the staff light and strong in structure. Clamping collars 2, formed circular in outline, are secured to the staff 1 by means of bolts 3 which engage the off-set ends 4 of the clamping collars and are held in place by means of nuts 5 having a threaded engagement with the ends of said bolts. Conductor collars 9, 10, 11 and 12 are secured to the staff collars in any suitable manner, preferably by means of rivets 13, as shown in Figs. 7 and 8. The conductor collars are provided with apertures 14, as shown in Fig. 6, adapted to receive a loop 15 formed in conductor rods 16, 16ª which are secured in place in the conductor collars by means of split rings 17. By means of such construction a conductor is formed having a skeleton frame and attached to a supporting stem adapted to be held by a user without injuring the fruit passing through the conductor.

The interior of the conductor is provided with a lining 18, which is designed to prevent the fruit from coming in contact with the conductor collars and rods, and may be made of fabric, such as linen, hemp or cotton, preferably of loose woven material of the texture of standard heavy grain sacks, and of a thickness approximately of eight or ten ounce ducking. The lining 18 is secured to the conductor collars in any suitable manner, preferably by detachable means adapted to permit the lining to be removed from the conductor collars when desired. An elbow 19 made of textile material, is attached to the lower conductor collar 12 by means of hooks 20 or otherwise, and is provided with a curved yielding side or false bottom 21, which is cushioned in the elbow by means of any suitable soft material, such as cotton 22, arranged between the false bottom 21 and the outer rounding portion 23 of the elbow. The rear portion of the elbow is preferably attached to the staff 1 by means of a hook 24 which supports the upper end of the back of the elbow and also the upper end of the lining forming the false bottom thereof, as shown in Fig. 2.

The conductor rods 16 extend above the top conductor collar 9 and are connected at their upper ends to pivoted arms 25, and are secured thereto preferably by riveting the ends of the conductor rods onto the arms 25. Auxiliary bars 26 are also attached at their upper ends to the arms 25, and converge at their lower ends to the staff 1 to which they are secured by means of bolts 27 or otherwise. Auxiliary rods 28 are also attached at their upper ends to the arms 25, and at their converging lower ends are secured to the stem 1 by means of bolts 29. A single auxiliary central rod 30 is also secured at its lower end to the staff 1, and at its upper end to the arms 25 preferably forming at its upper end a pivotal or hinge pin 31 to which the ends of the arms 25 are hinged and secured in place by means of a nut 32. The rods 26, 28 and 30 are curved outward from the axial line of the conductor so as to form an auxiliary receptacle in line with the converging ends of the arms 25. Oppositely disposed auxiliary rods 33 are attached at their lower ends by any suitable means to the upper conductor collar 9, preferably by turning the lower end of said rods under the lower edge of the conductor collar 9, as indicated by dotted lines in Fig. 4. The upper ends of said rods are secured to the free ends of the arms 25, as indicated in Fig. 3, and form pivot pins for links 34 which are pivoted to said pins at their outer ends and are provided with off-set inner ends 34ª which engage freely an eye 35 formed preferably on the ends of the rods 16ª. The rods 33 and the other rods forming the sides of the receptacle are preferably flattened at the lower portion of the receptacle so as to permit them to bend readily when the receptacle is opened or closed. Sleeves 36 are attached to the auxiliary rods 33 in any suitable manner, as by forming a thread on said rods adapted to engage the sleeves for the purpose of supporting links 37 which are attached at their outer ends to the sleeves 36 and freely connected at their inner ends with an adjusting plate 38, which is provided with apertures 38$^a$ arranged in opposite series adapting the ends of the links 37 to be adjustably connected with said plate; the said plate is also provided with an off-set lip 39 having an operating rod 40 connected therewith.

The plate 38 is pivotally mounted upon a bolt 41 which also supports a washer 42 and a clamping plate 43, indicated by dotted lines in Fig. 4, the edges of which plate are turned over onto and clamp the parallel portions of the front conductor rods 16$^a$ so as to provide means adapted to support the adjusting plate 38. The rod 40 which operates the adjusting plate 38 may be held steadily in position by means of a guide rod 44 secured to the conductor collars 9 and 10, preferably by means of bent ends which engage the loops 15 of the conductor rods 16$^a$, as shown in Fig. 4. The lower end of the operating rod 40 is attached to a lever 45 provided with an off-set end 46 which is attached to the ears 4 of the conductor collar 11, and held in place therein by means of the bolt 3 connected therewith. A handle 47 is attached to the end of the operating lever 45, and the shank of the lever is held in place on the conductor collar 11 by means of guide rods 48 which may be of any suitable construction, such as the rods shown in Fig. 2, which are provided on one end with an eye adapted to engage a loop 49 attached to the conductor collar 11, and held together by means of split keys 50 so as to enable said rods to be detached from the conductor collar when desired. The opposite ends of said guide rods are off-set and engage eyes 51 attached to the conductor collar 11, the collar being preferably reinforced at such portion by means of plates 52 adapted to sustain the wear caused by the operating lever on the conductor collar. A stop 53, shown in Fig. 5, may also be attached to the bearing plates 52 adapted to limit the movement of the operating lever. The shank of the operating lever is provided with a lug 54 having apertures 57 formed therein adapted to receive the end of the operating rod 40. I prefer to provide the lug of the lever with more than one aperture so that if the end of the operating rod 40 becomes broken at its junction with the operating lever, the end of the rod may be again turned over so as to engage the other aperture formed in said lever. Braces 55 may, if desired, be attached to the conductor collars and the staff collars, to stiffen the conductor collars and make a more rigid and firm connection with the staff collars.

It is obvious that some of the features of my invention may be employed without the others. In some instances I prefer to dispense with the skeleton frame of the conductor hereinbefore described, and use instead a conductor tube 56 which may be made of any suitable material. Such a conductor may be used with a receptacle and connected operating mechanism of the character already described. In order to make the conductor adjustable in diameter so as to enable the picker to be used with fruit of various sizes, I prefer to form the conductor collars so that their ends may be overlapped, as shown in Figs. 7 and 8. When it is desired to reduce the diameter of the conductor the overlapping ends of the collars may be disengaged from the loops of the central wires 16$^a$ and connected with the wires 16 adjacent thereto. For the purpose of enabling the conductor collars to be adjusted relatively to the conductor rods so as to vary the diameter of the conductor, auxiliary apertures 14 are formed in the conductor collars adapted to receive the loops of the conductor rods when arranged to vary the diameter of the conductor in the manner already described.

When the device is in use the operator may provide himself with a receiving basket having a sling attached thereto, adapted to be supported over the shoulder of the user, and the device herein described is held by the user with the discharge elbow 19 arranged within or in close proximity to the receiving basket. The fruit is removed from the tree by placing the end of the picker in contact with the fruit so as to place the fruit within the receptacle formed on the upper end of the picker. When the fruit is within the receptacle of the picker the upper end of the picker is moved so as to bring the fruit within the auxiliary chamber formed by the rods 26, 28, and 30, as already described. In so doing the fruit is placed beneath the rear ends of the arms 25, the under surface of said arms bearing against the upper portion of the fruit, and by pulling downward on the picker in the direction of its length the stem of the fruit is detached from the tree and falls down the conductor to the lower portion thereof, where the force of its fall is broken by the cushion or false bottom 21 of the picker, and from the discharge end of the conductor the fruit passes into the basket provided for that purpose. The arms 25 are preferably made flat so as to obtain a better hold on the fruit than if made round in outline. In cases where the fruit is not readily removed from the tree by grasping it in the auxiliary chamber and pulling downward on the picker, as already described, the picker receptacle is placed around the fruit and the lever 45 pressed downward by the user, which by means of the rod 40 connected therewith rotates the adjusting plate 38 on its pivotal support 41 and draws the links 37 inward and the auxiliary rods 33 connected therewith, thereby drawing the arms 25 toward each other because of the connection between the forward ends of said arms and the upper ends of the auxiliary rods 33, by means whereof the fruit is firmly grasped by the arms 25, and the stem of the fruit is broken from the tree by pulling downward on the picker in the manner already described. The links 34 which are connected to the ends of the arms 25, during such operation prevent the fruit from sliding out of the clutch formed by the arms 25, and also serve as means for pressing and holding in proper position the upper end of the receptacle of the picker.

The rods 33 and the other rods forming the receptacle are made of resilient metal so as to spring back when pressure is released from the lever 45, thereby holding the receptacle normally open.

In the construction herein shown and described, I have embodied my invention in its preferred form. I do not desire to be limited to such construction, however, as other means having similar capabilities may be used without departing from my invention.

Having thus described my invention, what I claim as new and desire to secure by Letters Patent is:

1. A fruit picker having a conducting tube comprising longitudinal rods, collars secured to said rods, a receptacle connected with said tube, and a staff secured to said collars, substantially as shown and described.

2. The combination with a staff, of a conducting tube secured to said staff, comprising longitudinal rods and collars secured to said rods and staff, and a receptacle provided with picking arms extending transversely of the axial line of said tube, substantially as shown and described.

3. The combination of a staff, a conducting tube mounted on said staff, a receptacle having a skeleton frame connected with said tube and hinged arms extending transversely of the axial line of said tube, an adjusting plate mounted on said receptacle, and means connected with said adjusting plate adapted to operate the free ends of said arms, substantially as shown and described.

4. The combination with a staff, of a conducting tube mounted thereon, a receptacle connected with said tube, and comprising a skeleton frame, formed of vertically extending rods and hinged grasping arms connected to the upper ends of said rods, substantially as shown and described.

5. The combination with a staff, of collars mounted on said staff, braces attached to said staff and collars, conductor rods connected to said collars, and a lining for said collars and rods, substantially as shown and described.

6. In a fruit picker, the combination with a staff, of collars mounted on said staff and provided with apertures, conductor rods provided with loops adapted to engage the apertures of said collars, and means for securing said loops in said apertures, substantially as shown and described.

7. The combination with a staff, of collars mounted on said staff, conductor rods connected with said collars, hinged grasping arms secured to the ends of said rods, and a lever mounted on said staff and connected with said grasping arms, substantially as shown and described.

8. The combination with a staff, of a conducting tube mounted thereon and provided with supporting collars, a receptacle connected with said tube and provided with hinged grasping arms extending transversely of the axial line of said tube, mechanism adapted to operate said grasping arms, and a lever having an adjustable connection with said mechanism, substantially as shown and described.

9. The combination with a staff, of a conducting tube mounted thereon, comprising collars secured to said staff, and rods secured to said collars, a receptacle having grasping arms extending transversely of the axial line of said tube, a lever and connecting mechanism adapted to operate said arms, and guide rods adapted to secure said lever in position on said tube, substantially as shown and described.

10. The combination with a staff, of a conducting tube secured thereto, and comprising collars attached to said staff, longitudinal rods secured to said collars, and a cushioned discharge spout detachably secured to one of said collars, substantially as shown and described.

11. The combination of a staff, a skeleton receptacle having an off-set portion, and a skeleton conductor tube connected to said receptacle, picking arms pivotally attached to the off-set portion of said receptacle, resilient rods connected to the free ends of said arms, and lever operated mechanism connected with and adapted to close the free ends of said arms, substantially as shown and described.

12. A fruit picker having a staff, a receptacle mounted on said staff and provided with an off-set portion, picking arms pivoted to the off-set portion of said receptacle, resilient rods connected at their ends to the free ends of said picking arms, and means adapted to operate the free ends of said picking arms, substantially as shown and described.

In testimony whereof I have signed my name to this specification in the presence of two subscribing witnesses.

EMIL GIER.

Witnesses:
MIKE BRUCKNER,
PETER BLAKE.